United States Patent [19]
Merger et al.

[11] 3,862,215
[45] Jan. 21, 1975

[54] PRODUCTION OF 2,2-DIMETHYL-1,3-PROPANEDIOL MONOESTERS OF HYDROXYPIVALIC ACID

[76] Inventors: Franz Merger, 25 Max-Slevogt-Strasse, 6710 Frankenthal; Gerd Duembgen, 4 Sudetenstrasse, 6701 Dannstadt; Werner Fuchs, 30b Muenchbuschweg, 6700 Ludwigshafen, all of Germany

[22] Filed: July 3, 1973

[21] Appl. No.: 376,130

[30] Foreign Application Priority Data
  July 7, 1972  Germany................. P 22 33 357
  July 10, 1972  Germany................. P 22 33 897
  July 12, 1972  Germany................. P 22 34 110

[52] U.S. Cl................................................ 260/484 R
[51] Int. Cl............................................... C07c 69/66
[58] Field of Search................................. 260/484 R

[56] References Cited
UNITED STATES PATENTS
3,057,911  10/1962  Finch................................... 260/484
3,641,117  2/1972  Platz et al....................... 260/484 R

*Primary Examiner*—Lorraine A. Weinberger
*Assistant Examiner*—Paul J. Killos
*Attorney, Agent, or Firm*—Johnston, Keil, Thompson & Shurtleff

[57] ABSTRACT

The production of 2,2-dimethylpropanediol hydroxypivalic monoester by disproportion of hydroxypivalaldehyde in the presence of a metal oxide or metal hydroxide. The product is a starting material for plastics and plasticizers.

13 Claims, No Drawings

PRODUCTION OF 2,2-DIMETHYL-1,3-PROPANEDIOL MONOESTERS OF HYDROXYPIVALIC ACID

The invention relates to a process for the production of 2,2-dimethyl-1,3-propanediol hydroxypivalic monoester by disproportionation of hydroxypivalaldehyde in the presence of a metal hydroxide or metal oxide.

U.S. Pat. No. 3,641,117 relates to a process for the production of 2,2-dimethyl-1,3-propanediol hydroxypivalic monoester by disproportionation of hydroxypivalaldehyde at elevated temperature in the presence of calcium, barium or strontium hydroxide.

The conversion of aldehydes to esters requires selective catalysts. On prior art method, the Tishchenko reaction, uses sodium or aluminum alcoholates in an anhydrous medium (Krauch-Kunz, "Reaktionen der organischen Chemie," Hüttig 1966, page 592). The Tishchenko reaction has not been widely applied because the alcoholate catalysts are easily poisoned and lose their activity (Royals, "Advanced Organic Chemistry," Prentice Hall, New York, 1954, page 723).

The reaction may be carried out thermally in the absence of catalysts in the case of hydroxypivalaldehyde to form 2,2-dimethyl-1,3-propanediol hydroxypivalic monoester (German Pat. No. 1,168,411); the addition of large amounts of water decreases the yield of ester or prevents the reaction [J. Org. Chem., volume 25 (1960), page 2219; U.S. Pat. No. 3,057,911].

It is known that hydroxypivalaldehyde can be disproportionated in the presence of magnesium ethyl iodide to form 2,2-dimethyl-1,3-propanediol hydroxypivalic monoester. The purity of the end product in the said methods is unsatisfactory. For example yellowish polyesters which are unsuitable for use for special purposes in the plastics industry are obtained using the esters prepared in the said manner as starting materials.

Three specific catalysts in the form of calcium hydroxide, barium hydroxide and strontium hydroxide are described in said U.S. Pat. No. 3,641,117 for the production of 2,2-dimethyl-1,3-propanediol hydroxypivalic monoester from hydroxypivalaldehyde. It is emphasized that as a rule no solvent is used; all the Examples describe reaction in an anhydrous medium. Waste water treatment problems play a decisive role in connection with protection of the environment particularly in industrial scale operations and it is a disadvantage in this method that alkaline earths can only be separated with difficulty from the waste water, for example by precipitation. A certain amount remains in solution, for example as hydroxide, or in fine suspension, for example as sulfate, and may give rise to disturbances in the waste water. Under changed conditions further amounts of alkaline earths may be precipitated from waste water treated in this way and disturbance may thus be caused for example by deposits in plant. The alkaline earths cause hardness. An alkaline earth metal hydroxide precipitated in waste water treatment depending on the type of treatment is difficult to filter and requires additional separation measures. Barium hydroxide and strontium hydroxide are not always readily accessible and economically viable catalysts. Calcium, strontium and barium are more or less completely separable in solid form from aqueous solutions (waste water) only as sulfates or carbonates. Strontium and barium salts are toxic. Depending on the waste water situation other metal bases are advantageous, for example in the case of phosphate-containing waste water metals which are separable as a precipitate with phosphate (for example, Li, Mg and Zn); in waste water containing hydrogen sulfide, metals which forms sparingly soluble sulfides; in electrolytic apparatus, metals which are readily deposited electrolytically; in the case of specific action of a metal base in waste water [for example $Fe(OH)_3$ as a flocculant].

As regards other hydroxides and bases it has hitherto only been known that aldehydes in the presence of metal hydroxides undergo the Cannizzaro reaction to form alcohols and carboxylic acids or the corresponding carboxylic esters are hydrolyzed into the same products. Thus U.S. Pat. No. 2,895,996 discloses a process for the purification of neopentyl glycol (prepared from hydroxypivalaldehyde) by hydrolysis of the ester obtained as a byproduct in the Cannizzaro reaction at 60° to 150° C in the presence of water to form neopentyl glycol and hydroxypivalate. On the other hand it is known that hydroxypivalaldehyde can be converted in the conventional Cannizzaro reaction with caustic potash solution into neopentyl glycol and hydroxy pivalate [Monatshefte 22 (1901), 66 et seq.; J. Amer. Chem. Soc. 70 (1948) 2592 to 94]. An article in Ber., volume 84 (1951), pages 229 to 245 mentions the strong influence of this type of catalyst on the Cannizzaro reaction and shows that in the case of formaldehyde lithium hydroxide and thallium hydroxide are better catalysts for this reaction than potassium hydroxide; the formate formed in the reaction additionally promotes the reaction. It is disclosed that compounds are better catalysts the lower their basicity is. Methanol (formed from formaldehyde in the Cannizzaro reaction) has an inhibiting effect on the reaction, whereas isopropyl alcohol promotes it. Aliphatic oxyaldehydes having sterically hindered hydroxy groups such as α-hydroxy-α-methylpropionaldehyde are said to smoothly undergo the Cannizzaro reaction.

The object of this invention is to provide a new process for the production of 2,2-dimethyl-1,3-propanediol hydroxypivylic monoester in higher purity and higher space-time yield and in a simpler and more reliable manner as far as protection of the environment is concerned.

This object is achieved by carrying out the reaction in the presence of calcium hydroxide, barium hydroxide or strontium hydroxide and in the presence of water or (instead of calcium hydroxide, barium hydroxide or strontium hydroxide or additionally to these hydroxides) in the presence of one or more oxides and/or hydroxides of lithium, magnesium, thallium, lead, bismuth, lanthanum, cerium, zinc, cadmium, manganese, iron, cobalt nickel and/or oxides of calcium, strontium or barium in the absence or presence of water.

In relation to U.S. Pat. No. 3,641,117 the process of the present invention uses (instead of barium, calcium or strontium catalysts) catalysts of other metals which according to the waste water situation and operating conditions are simpler, more reliable or more convenient to use; their separation from the waste water may be easier and more complete, and the waste water may be reused, which is desirable from an environment point of view. The process may surprisingly be used in the presence of water without loss of yield.

As compared with other prior art methods the process of the invention surprisingly gives 2,2-dimethyl-1,3-propanediol hydroxypivalic monoester in better yields and good purity and in a higher spacetime yield of pure end product. The hydroxypivalaldehyde used as starting material may be used in purified form or in the form of the crude end product of the reaction of isobutyraldehyde with formaldehyde. The reaction rate is higher and the reaction may even be carried out at room temperature. The reaction mixture from the reaction of isobutyraldehyde and formaldehyde to form hydroxypivalaldehyde in an aqueous medium, for example with a tertiary amine as catalyst (DOS No. 1,793,512) may be used as starting material in commercial operations. A reaction in the presence of water may also be advantageous with regard to the following separation and purification of the ester obtained; for example a purification can be carried out by means of an acid ion exchanger without troublesome side reactions, for example polyacetal formation. Losses in yield occur because of the volatility of the starting material in steam if the water in the reaction mixture from the aldehyde production has to be removed; this loss in avoided when the production of the ester is carried out in the presence of the said water. Byproducts based on Cannizzaro reactions or hydroxypivalic neopentylglycol ester monoformate do not occur to any appreciable extent.

When alkaline earth metal hydroxides are used together with water in the process of the invention it gives 2,2-dimethyl-1,3-propanediol hydroxypivalic monoester surprisingly in better yield, good purity and a higher space-time yield of pure end product than the prior art. The reaction rate is higher and the reaction may even be carried out at ambient temperature. Since the starting material is prepared by a conventional method, for example in the presence of potassium carbonate or a tertiary amine, from isobutyraldehyde and formaldehyde in aqueous medium, this reaction mixture, if necessary after concentration, may be used as starting mixture in the process of this invention in a simple and economical manner with the addition of the alkaline earth metal hydroxide. Depending on the method of processing the reaction in the presence of water may also be advantageous in respect of the separation and purification of the end product which follows.

The use of calcium oxide, barium oxide and strontium oxide instead of the hydroxides is advantageous only in special cases, for example if handling, metering or storage is simpler or more convenient in the form of oxides or if only the oxide is available. Calcium oxide, barium oxide and strontium oxide are conveniently used without adding water.

The hydroxides of magnesium, lead, lanthanum, cerium, zinc, cadmium and manganese are preferred from among the hydroxides. Mixtures of two or more hydroxides may be used. More than one hydroxide of the same metal may also be used simultaneously, for example a mixture of ferrous hydroxide and ferric hydroxide. The hydroxides may also contain adsorbed water. Cerium hydroxide may be used mixed with other rare earth hydroxides.

The following are examples of catalysts: LiOH, $Mg(OH)_2$, $Pb(OH)_2$, $Zn(OH)_2$, $Cd(OH)_2$, $Ce(OH)_3$, $Mn(OH)_2$, $Fe(OH)_2$, $Ni(OH)$, $Ni(OH)_2$ and $Co(OH)_2$; also the said hydroxides on activated carbon or petroleum coke as a carrier.

Preferred oxides are those of magnesium, calcium, strontium, barium, lead, lanthanum, cerium, zinc, cadmium and manganese. Mixtures of two or more than two oxides may also be used and these may contain other components such as silicon dioxide or aluminum oxide; for example appropriately composed cements, mortars or concretes are suitable as catalysts, conveniently in the form of powders. Two or more than two oxides of the same metal may also be used simultaneously, for example mixtures of $Fe_2O_3$ and $Fe_3O_4$. The oxides may also be used in the form of their oxide hydrates, for example hydrated ferric oxide, or may contain adsorbed water, for example in the form of dehydrated oxides. Mixtures of oxides with hydroxides, for example of calcium oxide and calcium hydroxide, or double oxides, for example cadmium-ferric double oxide, are also suitable. Cerium oxide may be used mixed with other oxides of the rare earths.

The following are examples of suitable catalysts: MgO, CaO, SrO, BaO, PbO, $Ob_3O_4$, ZnO, CdO, $La_2O_3$, $CeO_2$, $MnO_2.H_2O$, $Fe_2O_3.H_2O$; the said oxides are hydrated oxides on activated carbon or petroleum coke as a carrier; cements containing from 50 to 78% of CaO by weight, from 0 to 2% by weight of MgO, from 10 to 25% by weight of $SiO_2$, from 3 to 10% by weight of $Al_2O_3$ and from 0 to 5% by weight of $Fe_2O_3$; concrete powder of similar composition to the abovementioned cements and a proportion of from 20 to 75% by weight of $SiO_2$.

The starting materials may be disproportionated at above only 10° C and particularly at an elevated temperature of from 30° to 170° C; the reaction is however conveniently carried out at a temperature of from 50° to 170° C, preferably at from 50° to 120° C, at atmospheric or superatmospheric pressure, continuously or conveniently batchwise. The metal hydroxides or oxides are generally used in an amount of from 0.1 to 20% by weight, preferably from 1 to 10% and particularly from 1 to 5% by weight based on hydroxypivalaldehyde. Amounts of from 20 to 25% and of more than 25% by weight of hydroxide or oxide may also be used. The catalysts are advantageously used in finely divided form, for example in particle sizes of from 0.01 to 0.3 mm and if desired on carrier materials, for example silicates, silica gel, activated carbon or petroleum coke. The starting material may be reacted in the presence of water, conveniently in an amount of from 3 to 60% by weight, preferably of from 5 to 40% by weight, based on starting material.

In the case of calcium hydroxide, barium hydroxide and strontium hydroxide it is convenient to use from 3 to 100% and preferably from 5 to 25% by weight of water based on hydroxypivalaldehyde. The reaction rate in the case of these catalysts is so high that with suitable withdrawal of heat of reaction conversions of more than 90% can be achieved in a few minutes.

The reaction may be carried out for example as follows: a mixture of hydroxypivalaldehyde, catalyst and conveniently water is kept at the reaction temperature for from 6 minutes to 10 hours. The reaction mixture is then filtered and the filtrate is subjected to fractional distillation. It is convenient to use, instead of the starting material, the reaction mixture in which it has been prepared by reaction of formaldehyde and isobutyraldehyde for example in the presence of potassium carbonate or a tertiary amine in an aqueous medium (DOS No. 1,793,512). The reaction mixture is advantageously concentrated to a content of 20 to 30% by weight of water, the amine and excess isobutyraldehyde conveniently being separated; the catalyst is added and the process of the invention is carried out as described above. To isolate and purify the end product the reaction mixture from the reaction of this invention may if desired be filtered and the filtrate passed through an acid ion exchanger for example by the method of German Pat. No. 1,643,671, preferably for from 10 to 60 minutes at from 30° to 50° C.

When calcium hydroxide, barium hydroxide or strontium hydroxide is used the reaction may be carried out for example as follows: a mixture of hydroxypivalaldehyde, one of the said alkaline earth metal compounds and water is kept at the reaction temperature for from 10 to 60 minutes. The reaction mixture is then filtered and the filtrate is passed through an ion exchanger, conveniently by the method described in German Pat. No. 1,643,671, preferably at from 30° to 50° C for from 10 to 60 minutes. The filtrate is then subjected to fractional distillation so that 2,2-dimethyl-1,3-propanediol hydroxypivalic monoester separates at a boiling point of 152° C at 10 mm. The reaction mixture obtained in the production of the starting material may conveniently be used instead of the starting material itself. The hydroxypivalaldehyde is preferably prepared by reaction of formaldehyde and isobutyraldehyde in the presence of a tertiary amine by the method described in DOS 1,793,512. It is convenient to concentrate the mixture to a content of from 10 to 20% by weight, to add the alkaline earth metal hydroxide and to carry out the reaction of the invention in the manner described above.

The following Examples illustrate the invention. The parts specified in the Examples are parts by weight.

EXAMPLE 1

166 parts of 37% by weight aqueous formaldehyde solution and 164 parts of isobutyraldehyde are mixed at 45° C under nitrogen with 10 parts of triethylamine by stirring. The temperature of the mixture rises in the course of 15 to 20 minutes to 93° to 94° C. The whole is stirred for another ten minutes at 93° to 94° C and the reaction mixture is then fractionated at 12 mm. Triethylamine and water are removed. 204 parts of 2,2-dimethyl-3-hydroxypropanal is obtained having a boiling point of 78° to 80° C. It is stirred together with 2.5 parts of lithium hydroxide in the form of a finely divided powder for 90 minutes at 100° C in a stirred apparatus. A reaction mixture is obtained which crystallizes on cooling and according to gas chromatographic analysis has the following composition (disregarding the catalyst):

| | |
|---|---|
| hydroxypivalic neopentyl glycol ester (HPN) | 91.2% |
| hydroxypivalic neopentyl glycol ester monoformate (HPNF) | —% |
| 2-(hydroxy-tert.butyl)-5,5-dimethyldioxane-(1,3) (the acetal of neopentyl glycol with HPA) (NPGA) | 0.1% |
| neopentyl glycol monoisobutyrate (NPGI) | 1.8% |
| neopentyl glycol (NPG) | 2.2% |
| hydroxypivalaldehyde (HPA) | 4.7% |

EXAMPLES 2 TO 6

As described in Example 1 204 parts of hydroxypivalaldehyde is reacted in each case in the presence of $a$ parts of catalyst K at a temperature T° C for the period $t$. The reaction mixture is freed from undissolved catalyst by filtration and has the composition in % by weight given in Table 1.

EXAMPLES 7 AND 8

As described in Example 1 a solution of 204 parts of hydroxypivalaldehyde having a content of from 15 to 25% by weight of water is prepared in each case and reacted at a temperature T° C for the period $t$ minutes in the presence of $a$ parts of catalyst K. The organic portion of the filtered reaction mixture, i.e., the reaction mixture disregarding water and catalyst, has the composition given in % by weight in Table 1.

TABLE I

| Example | Catalyst K | a (parts K) | T (°C) | t (Min.) | HPN (%) | HPNF (%) | NPGA (%) | NPGI (%) | NPG (%) | HPA (%) |
|---|---|---|---|---|---|---|---|---|---|---|
| 2 | Mn(OH)₂ | 11 | 100 | 60 | 82.0 | — | — | 4.0 | 5.8 | 8.2 |
| 3 | Fe(OH)₂ | 11 | 100 | 60 | 50.1 | — | — | 2.1 | 4.2 | 43.6 |
| 4 | Fe(OH)₂ | 11 | 100–110 | 300 | 84.5 | 0.2 | 3.4 | 2.3 | 7.5 | 2.1 |
| 5 | Co(OH)₂ | 12 | 100 | 60 | 42.1 | — | — | 1.5 | 2.1 | 54.3 |
| 6 | Ni(OH)₂ | 12 | 100 | 60 | 36.4 | — | 3.9 | 1.1 | 1.9 | 56.7 |
| 7 | Mn(OH)₂ | 12 | 70 | 360 | 83.9 | — | 0.5 | 2.6 | 2.7 | 10.3 |
| 8 | CE(OH)₂ | 23 | 70 | 360 | 78.5 | — | 0.7 | 1.3 | 1.9 | 17.6 |

EXAMPLE 9

162 parts of 37% aqueous formaldehyde solution and 160 parts of isobutyraldehyde are mixed with 10 parts of triethylamine by stirring under nitrogen at 45° C. The temperature of the mixture rises under reflux to 93° to 94° C in the course of 15 to 20 minutes. The mixture is stirred for another 10 minutes at 93° to 94° C and the reaction mixture is then fractionated at 760 mm. Triethylamine, excess isobutyraldehyde and 63 parts of water are removed. The remaining solution of hydroxypivalaldehyde is cooled to 60° C. 5 parts of finely powdered calcium hydroxide is added with vigorous stirring. The reaction mixture is heated by the reaction heat to boiling temperature for 8 minutes; excess heat is removed by evaporative cooling. After evolution of heat has subsided and after stirring for a short time (a total of 30 minutes) the hot suspension is filtered at 90° to 95° C and a filtrate is obtained whose organic portion (195 parts) has the following composition:

| | % by weight |
|---|---|
| hydroxypivalic neopentylglycol ester (HPN) | 89.0 |
| hydroxypivalic neopentylglycol ester monoformate (NPNF) | — |
| 2-(hydroxy-tert.-butyl)-5,5-dimethyldioxane-1,3) (acetal of neopentylglycol with hydroxypivalaldehyde) (NPGA) | — |
| neopentylglycol monoisobutyrate (NPGI) | 1.4 |
| neopentylglycol (NPG) | 4.4 |
| hydroxypivalaldehyde (HPA) | 5.2 |

170.5 parts of hydroxypivalic neopentylglycol ester of the boiling point 129° to 130° C at 2 mm and the melting point 50° to 51° C is obtained by fractional distillation, equivalent to 83.6% of theory based on formaldehyde used.

EXAMPLE 10

A solution of 204 parts of hydroxypivalaldehyde in 204 parts of water prepared anaolgously to Example 9 is reacted with 6 parts of finely powdered calcium hydroxide at 55° C with vigorous stirring. After a reaction period of ten minutes the evolution of heat subsides. The whole is stirred for another 15 minutes. The mixture is filtered and the following composition of the 204 parts of the organic portion of the solution is determined by gas chromatography analogously to Example 9:

| | % by weight |
|---|---|
| hydroxypivalaldehyde | 9.3 |
| neopentylglycol | 7.3 |
| neopentylglycol monoisobutyrate | 1.7 |
| hydroxypivalic neopentylglycol ester | 81.7 | equivalent to 90% of theory based on hydroxypivalaldehyde reacted.

EXAMPLE 11

A solution of 204 parts of hydroxypivalaldehyde in 612 parts of water prepared as described as Example 9 is reacted at 60° C with vigorous stirring with 8 parts of finely powdered calcium hydroxide. When the exothermic reaction has subsided the whole is stirred until the total period is 40 minutes and the following composition of the 204 parts of the organic portion of the solution is determined by gas chromatography as described in Example 9:

| | % by weight |
|---|---|
| hydroxypivalaldehyde | 11.2 |
| neopentylglycol | 9.7 |
| neopentylglycol monoisobutyrate | 1.6 |
| hydroxypivalic neopentyl glycol ester | 77.5 | equivalent to 87.3% of theory based on hydroxypivalaldehyde reacted.

EXAMPLES 12 TO 13

As described in Example 9 a solution of 204 parts of hydroxypivalaldehyde having a content of from 15 to 25% by weight of water is reacted in each case at a temperature T° C for a time $t$ minutes with $a$ parts of a catalyst K. The organic portion (204 parts) has the composition given in % by weight in Table 2.

TABLE 2

| Example | 12 | 13 |
|---|---|---|
| Catalyst K | Sr(OH)$_2$ | Ba(OH)$_2$ |
| Parts a of K | 10 | 14 |
| T°C | 60–100 | 60–100 |
| t minutes | 30 | 30 |
| HPN% by weight | 86.2 | 83.7 |
| HPNF% by weight | — | — |
| NPGA% by weight | 0.5 | 0.6 |
| NPGI% by weight | 1.5 | 1.6 |
| NPG% by weight | 4.8 | 5.0 |
| HPA% by weight | 7.0 | 9.1 |

EXAMPLE 14

166 parts of 37% by weight aqueous formaldehyde solution and 164 parts of isobutyraldehyde are mixed with 10 parts of triethylamine by stirring at 45° C under nitrogen. The temperature of the mixture rises to 93° to 94° C in the course of 15 to 20 minutes. Stirring is continued for another 10 minutes at 93° to 94° C. The reaction mixture is then fractionated at 12 mm. After triethylamine and water have been removed, 204 parts of 2,2-dimethyl-3-hydroxypropanal having a boiling point of from 78° to 80° C is obtained. It is stirred with 3.2 parts of finely divided magnesium oxide for 1 hour at 100°C. The hot reaction mixture is filtered at 85° C and the filtrate obtained is a clear liquid which crystallizes on cooling and according to gas chromatographic analysis has the following composition:

| | % by weight |
|---|---|
| hydroxypivalic neopentylglycol ester (HPN) | 87.6 |
| hydroxypivalic neopentylglycol ester monoformate | 0.1 |
| 2-(hydroxy-tert.-butyl)-5,5-dimethyldioxane-(1,3) (acetal of neopentylglycol with HPA) (NPGA) | 0.1 |
| neopentylglycol monoixobutyrate (NPGI) | 0.4 |
| neopentyl glycol (NPG) | 0.6 |
| hydroxypivalaldehyde (HPA) | 11.2 |

175.5 parts of hydroxypivalic neopentylglycol ester of the boiling point 128° to 130° C at 2 mm (melting point 51° C) is obtained, equivalent to 86% of theory.

EXAMPLES 15 TO 26

As described in Example 14, 204 parts of hydroxypivalaldehyde is reacted in each case in the presence of $a$ parts of a catalyst K at a temperature T° C for the period $t$ minutes. The filtered reaction mixture has the percentage by weight composition given in the Table 3. The concrete powder has the composition: 29.4% by weight of CaO, 0.7% by weight of MgO, 65.3% by weight of SiO$_2$, 3.2% by weight of Al$_2$O$_3$ and 1.4& by weight of Fe$_2$O$_3$.

TABLE 3

| Example | Catalyst K | a (parts K) | T (°C) | t (Min.) | HPN (%) | HPNF (%) | NPGA (%) | NPGI (%) | NPG (%) | HPA (%) |
|---|---|---|---|---|---|---|---|---|---|---|
| 15 | CaO | 4.5 | 100 | 210 | 89.5 | 0.5 | 0.2 | 3.0 | 4.1 | 2.6 |
| 16 | SrO | 6.1 | 100 | 90 | 88.5 | 0.1 | 0.1 | 2.9 | 3.9 | 4.5 |
| 17 | BaO | 9.2 | 100 | 90 | 87.3 | 0.1 | 0.1 | 3.1 | 4.2 | 5.2 |
| 18 | PbO | 10 | 95–110 | 30 | 90.5 | 0.4 | — | 1.1 | 2.0 | 6.0 |
| 19 | PbO | 17 | 95–110 | 120 | 93.3 | 0.2 | 0.1 | 1.0 | 3.0 | 2.4 |
| 20 | Bi$_2$O$_3$ | 37 | 100 | 360 | 70 | 1.1 | 0.4 | 1.6 | 2.1 | 24.8 |
| 21 | Cu$_2$O | 11.2 | 100 | 180 | 30.1 | — | 0.2 | 0.6 | 0.9 | 68.2 |
| 22 | ZnO | 6.4 | 100 | 90 | 90.1 | — | — | 2.1 | 0.8 | 7.0 |
| 23 | CdO | 10 | 100 | 90 | 91.5 | — | 0.1 | 3.2 | 3.5 | 1.7 |
| 24 | La$_2$O$_3$ | 36 | 100 | 60 | 90.2 | — | — | 3.2 | 5.1 | 1.5 |
| 25 | CeO$_2$ | 14 | 100 | 180 | 94.6 | — | — | 0.9 | 2.2 | 2.3 |
| 26 | concrete powder | 16 | 120 | 120 | 85.5 | — | 0.1 | 1.0 | 1.9 | 11.5 |

EXAMPLES 27 TO 34

As described in Example 14 a solution of 204 parts of hydroxypivalaldehyde having a content of from 15 to 25% by weight of water is prepared in each case and is reacted at a temperature T° C for a period of $t$ minutes in the presence of $a$ parts of a catalyst K. The organic content of the filtered reaction mixture (i.e., the reaction mixture disregarding catalyst and water) has the composition in % by weight given in Table 4.

TABLE 4

| Example | Catalyst K | a (parts of K) | T (°C) | t (Min.) | HPN (%) | HPNF (%) | NPGA (%) | NPGI (%) | NPG (%) | HPA (%) |
|---|---|---|---|---|---|---|---|---|---|---|
| 27 | MgO | 4.8 | 70 | 360 | 83.0 | — | — | 2.0 | 4.0 | 11.0 |
| 28 | CaO | 6.7 | 70–100 | 40 | 84.5 | — | 0.2 | 1.4 | 9.7 | 4.2 |
| 29 | PbO | 25 | 70 | 360 | 80.4 | 0.1 | 0.3 | 2.9 | 8.0 | 8.3 |
| 30 | ZnO | 10 | 70 | 360 | 77.1 | — | 0.1 | 1.9 | 2.0 | 18.9 |
| 31 | CdO | 15 | 70 | 360 | 84.3 | — | 0.2 | 2.8 | 3.4 | 9.3 |
| 32 | MnO | 9 | 70 | 360 | 79.0 | 0.05 | 0.15 | 1.4 | 2.3 | 17.1 |
| 33 | $La_2O_3$ | 39 | 70 | 360 | 73.2 | — | 0.6 | 2.7 | 5.6 | 17.9 |
| 34 | $CeO_2$ | 21 | 70 | 180 | 32.0 | — | — | 0.1 | 2.4 | 65.5 |

We claim:

1. A process for the production of 2,2-dimethyl-1,3-propanediol hydroxypivalic monoester which comprises disproportionating hydroxypivalaldehyde at a temperature of from 10°–170° C in the presence of a catalytic amount of a catalyst selected from the group consisting of (A) calcium hydroxide, barium hydroxide or strontium hydroxide, (B) at least one oxide of a metal selected from the group consisting of lithium, magnesium, thallium, lead, bismuth, lanthanum, cerium, zinc, cadmium, manganese, iron, cobalt, nickel, calcium, barium and strontium; (C) one of said oxides (B) in admixture with at least one of said hydroxides (A); (D) at least one hydroxide of a metal selected from the group consisting of lithium, magnesium, thallium, lead, bismuth, lanthanum, cerium, zinc, cadmium, manganese, iron, cobalt, and nickel; (E) at least one of said hydroxides (D) in admixture with at least one of said hydroxides (A); and (F) at least one of said hydroxides (D) in admixture with at least one oxide of a metal selected from the group consisting of calcium, strontium and barium, and water being present in the reaction mixture from 3 to 100% by weight based on hydroxypivalaldehyde at least when said catalyst is said hydroxide (A).

2. A process as claimed in claim 1 wherein said catalyst is said catalyst (A), and water is present in the reaction mixture in an amount of 5–25% by weight, based on the hydroxypivalaldehyde.

3. A process as claimed in claim 1 wherein said catalyst is said catalyst B.

4. A process as claimed in claim 1 wherein said catalyst is said catalyst C.

5. A process as claimed in claim 1 wherein said catalyst is said catalyst D.

6. A process as claimed in claim 1 wherein said catalyst is said catalyst E.

7. A process as claimed in claim 1 wherein said temperature is in the range of 30° to 170° C.

8. A process as claimed in claim 1 wherein said elevated temperature is in the range of 50° to 120° C.

9. A process as claimed in claim 1 wherein said catalytic amount is in the range of 0.1 to 20% by weight, based on the hydroxypivalaldehyde.

10. A process as claimed in claim 1 wherein the catalytic amount is in the range of 1 to 5% by weight, based on the hydroxypivalaldehyde.

11. A process as claimed in claim 1, wherein said hydroxypivalaldehyde is disproportionated in the presence of one of said catalysts (B) through (F) and 3–100% by weight of water, based on the hydroxypivalaldehyde.

12. A process as claimed in claim 11 wherein the amount of water is 5–40% by weight.

13. A process as claimed in claim 1 wherein the hydroxypivalaldehyde used in the process is hydroxypivalaldehyde in a crude reaction product obtained by reaction of formaldehyde and isobutyraldehyde in the presence of potassium carbonate or a tertiary amine in an aqueous medium.

* * * * *

UNITED STATES PATENT AND TRADEMARK OFFICE
CERTIFICATE OF CORRECTION

PATENT NO. : 3,862,215
DATED : January 21, 1975
INVENTOR(S) : Franz Merger et al It is certified that error appears in the above-identified patent and that said Letters Patent are hereby corrected as shown below:

In the Heading, insert -- [73] Assignee: Badische Anilin & Soda-Fabrik Aktiengesellschaft, Ludwigshafen/Rhein, Germany --

In Column 5 and 6, In Table 1, Example 6, under the heading "Catalyst K" delete "N;(OH)$_2$" and insert --Ni(OH)$_2$--

In Column 5 and 6, In Table 1, Example 8, under the heading "Catalyst K" delete "CE(OH)$_2$" and insert --Ce(OH)$_2$--

In Column 8, Line 33 (Example 14), insert -- (HPNF)-- after "monoformate"

Signed and Sealed this

Fourteenth Day of September 1976

[SEAL]

Attest:

RUTH C. MASON
*Attesting Officer*

C. MARSHALL DANN
*Commissioner of Patents and Trademarks*